(12) United States Patent
Chung et al.

(10) Patent No.: US 7,220,807 B2
(45) Date of Patent: May 22, 2007

(54) PROCESS OF PREPARING FUNCTIONAL FLUOROPOLYMERS

(75) Inventors: Tze-Chiang Chung, State College, PA (US); Han Hong, State College, PA (US); Masahiko Oka, Mahwah, NJ (US); Katsuyoshi Kubo, Rye, NY (US)

(73) Assignees: Penn State Research Foundation, University Park, PA (US); Daikin Institute of Advanced Chemistry and Technology, Inc., Orangeburg, NY (US)

( * ) Notice: Subject to any disclaimer, the term of this patent is extended or adjusted under 35 U.S.C. 154(b) by 151 days.

(21) Appl. No.: 11/165,544

(22) Filed: Jun. 24, 2005

(65) Prior Publication Data

US 2006/0041090 A1 Feb. 23, 2006

Related U.S. Application Data

(63) Continuation-in-part of application No. 10/778,112, filed on Feb. 17, 2004, now Pat. No. 6,911,509.

(51) Int. Cl.
C08F 4/44 (2006.01)

(52) U.S. Cl. .................. 526/197; 526/196; 526/242; 526/247

(58) Field of Classification Search .............. 526/197, 526/196, 242, 247
See application file for complete search history.

(56) References Cited

U.S. PATENT DOCUMENTS

| | | | |
|---|---|---|---|
| 3,461,155 A | 8/1969 | Rice | |
| 4,158,678 A | 6/1979 | Tatemoto et al. | |
| 4,167,616 A * | 9/1979 | Bollinger | 526/197 |
| 4,544,720 A | 10/1985 | Ohmori et al. | |
| 4,612,357 A * | 9/1986 | Bekiarian et al. | 526/247 |
| 4,694,045 A * | 9/1987 | Moore | 525/276 |
| 5,286,800 A | 2/1994 | Chung et al. | |
| 5,401,805 A | 3/1995 | Chung et al. | |
| 6,248,837 B1 | 6/2001 | Chung et al. | |
| 6,277,937 B1 * | 8/2001 | Duvalsaint et al. | 526/255 |
| 6,355,749 B1 * | 3/2002 | Chung et al. | 526/255 |
| 6,420,502 B1 | 7/2002 | Chung | |
| 6,479,600 B2 | 11/2002 | Chung et al. | |
| 6,479,602 B1 * | 11/2002 | Moren | 526/196 |
| 6,515,088 B2 * | 2/2003 | Chung | 526/196 |
| 6,911,509 B1 * | 6/2005 | Chung et al. | 526/197 |
| 2002/0198338 A1 | 12/2002 | Chung | |

FOREIGN PATENT DOCUMENTS

WO WO-2005/085298 A1 * 9/2005

OTHER PUBLICATIONS

R. Saint-Loup, et al., "Synthesis and Properties of Novel Fluorotelechelic Macrodiols Containing Vinylidene Fluoride, Hexafluoropropene and Chlorotrifluoroethylene", Macromolecules, vol. 35, No. 5, pp. 1524-1536, 2002.

Masahiko Oka, et al., "Recent Development of Iodine-Terminated-Fluoroelastomers", Topics Polym. Sci., 4, 763, 1984.

B. Ameduir, et al., "Copolymerization of Fluorinated Monomers: Recent Developments and Future Trends", J. of Fluorine Chem., 104 (2000) 53-62.

Bernard Boutevin, et al., "Copolymerization of Fluorinated Monomers With Nonfluorinated Monomers. Reactivity and Mechanisms", Macromol. Symp. 82, 1-17 (1994).

Bruno Ameduri, et al., "Synthesis and Polymerization of Fluorinated Monomers Bearing a Reactive Lateral Group Part 7. Copolymerization of Tetrafluoroethylene with w-Hydroxy Trifluorovlnyl Monomers", J. Applied Polym. Sci. 73, 189, 1999.

B. Ameduri, et al., "Synthesis and Polymerisation of Fluorinated Monomers Bearing a Reactive Later Group. Parts 5 -Radical Addition of Iodine Monobromide to Chlorotrifluoroethylene to form a useful intermediate in the synthesis of 4,5,5-trifluoro-4-ene-Pentanol", J. of Fluorine Chem., 93 (1999) 117-127.

G. Kostov, et al., "New Approaches to the Synthesis of Functionlaized Fluorine-Containing Polymers" J. of Fluorine Chem., 114 (2002) 171-176.

T. C. Chung, et al. "Synthesis of Polypropylene-graft-poly(methyl methacrylate) Copolymers by the Borane Approach", Macromolectules, vol. 26, No. 14, Jul. 5, 1993, pp. 3467-3471.

Bing Lu, et al., "Maleic Anhydride Modified Polypropylene with Controllable Molecular Structure: New Synthetic Route via Borane-Terminated Polypropylene", Marcomolecules 1998, 31, 5943-5946.

Guangxue Xu, et al., "Borane Chain Transfer Agent in Metallocene-Mediated Olefin Polymerization. Synthesis of Borane- Terminated Polyethylene and Biblock Copolymers Containing Polyethylene and Polar Polymer", J. Am. Chem. Soc. 1999, 121, 6763-6764.

T. C. Chung, et al., "A Novel "Stable" Radical Initiator Based on the Oxidation Adducts of Alkyl-9-BBN", J. Am. Chem. Soc. 1996,118,705-706.

T.C. Chung, et al., "Synthesis and Properties of Ferroelectric Fluoroterpolymers with Curie Transition at Ambient Temperature", Macromolecules 2002, 35, 7678-7684.

T.C. Chung, et al., "Borane-containing Polyolefins: Synthesis and Applications", J. Organomet. Chem., 581, 178, 1999.

* cited by examiner

*Primary Examiner*—David W. Wu
*Assistant Examiner*—Henry S. Hu
(74) *Attorney, Agent, or Firm*—McDermott Will & Emery LLP

(57) ABSTRACT

Functional fluoro-monomers are polymerized with an organoborane functional initiator in the presence of oxygen to yield functional fluoropolymers and copolymers to produce functional polymers having functional groups at the beginning of the polymer chain.

10 Claims, No Drawings

PROCESS OF PREPARING FUNCTIONAL FLUOROPOLYMERS

CROSS REFERENCE TO RELATED APPLICATION

This application is a continuation-in-part of U.S. patent application Ser. No. 10/778,112, filed Feb. 17, 2004 now U.S. Pat. No. 6,911,509, which is hereby incorporated herein by reference.

FIELD OF THE DISCLOSURE

The present invention relates to functional fluoro-polymers and copolymers and processes for their preparation. In particular, the present invention relates to the polymerization of functional fluoro-monomers with initiators, such as organoborane/$O_2$ initiators, that can carry out stable radical polymerization without significantly engaging in chain transfer reaction to yield high weight polymers.

BACKGROUND

Fluoropolymers, such as poly(tetrafluoroethylene) (PTFE), poly(vinylidine fluoride) (PVDF), poly(vinylidine-co-hexafluoropropene) (VDF/HFP elastomer), etc., exhibit a unique combination of properties, including thermal stability, chemical inertness (acid and oxidation resistance), low water and solvent absorptivities, self-extinguishing, excellent weatherability, and very interesting surface properties. They are commonly used in many high-end applications, such as aerospace, automotive, textile finishing, and microelectronics. However, fluoropolymers also have some drawbacks, including limited processibility, poor adhesion to substrates, limited crosslinking chemistry, and inertness to chemical modification, which limit their applications when interactive and reactive properties are paramount. In the past decades, many research groups have focused on the preparation of functional fluoropolymers containing particular functional groups. In general, there are two approaches to achieving the direct incorporation of functional groups into fluoropolymers during the polymerization process, including (i) controlling the polymerization using functional initiators or chain transfer agents to prepare telechelic fluoropolymers containing terminal functional groups, and (ii) copolymerizing of fluorinated monomers with functional comonomers to form functional fluoro-copolymers containing pendent functional groups.

The first method of using functional initiator was pioneered by Rice and Sandberg at the 3M Company (see U.S. Pat. No. 3,461,155). They reported the preparation of low molecular weight telechelic VDF/HFP elastomers containing two ester terminal groups by using a diester peroxide initiator. The average functionality of the resulting telechelic VDF/HFP elastomer was not reported. However, it is logical to expect some difficulties in achieving a perfect telechelic structure with the functionality of two in each polymer, which requires all the propagating radicals involving radical coupling reaction in the termination step. Saint-Loup et al. (see *Macromolecules*, 35, 1542, 2002) also attempted to prepare telechelic VDF/HFP elastomers containing two opposing hydroxy terminal groups by using hydrogen peroxide as an initiator. Several advantages of using hydrogen peroxide initiator include cost, high reactivity, and directly forming hydroxy terminal groups. However, many side reactions are also occur in this polymerization, and the final product contains not only hydroxy terminal groups but also carboxylic acid terminal groups, as well as some unsaturated terminal groups. To improve the hydroxy content of hydroxy fluoroelastomers, the polymerization method requires an additional step, which is the reduction of any carboxylic acid group into opposing hydroxy end groups using a strong reducing agent, such as $LiAlH_4$, which sometimes generates more unsaturated double bond and causes the decoloration of the product.

In the late 1970's and early 1980's, Oka et al. disclosed an interesting iodine transfer polymerization (ITP) method to prepare telechelic fluoropolymers containing two terminal iodine groups. (see *Comtemp. Topics Polym. Sci.*, 4, 763, 1984; U.S. Pat. No. 4,158,678) The chemistry is based on the combination of a reversible addition-fragmentation chain transfer (RAFT) process and an $\alpha,\omega$-diiodoperfluoroalkane (I—$R_F$—I) chain transfer agent, where $R_F$ is $CF_2CF_2$, $CF_2CF_2CF_2CF_2$, $CF_2CFCl$, $CF_2CF(CF_3)$, etc. The living characteristics are usually demonstrated by the increase of molecular weight with conversion of monomer and relatively narrow molecular weight distribution (Mw/Mn<2). The active $CF_2$—I groups are always located at both ends of the polymer chain and maintain similar reactivity despite the growing polymer molecular weight. This reaction process has led to an important commercial product, i.e. a diiodo-terminated VDF/HFP elastomer with the trade name Dai-E1®, which is a liquid rubber at room temperature and is readily curable via heating or radiation to form a 3-D network that has excellent heat oil, solvent, chemical and ozone resistance, and high mechanical strength and low compression set. It is useful as a sealing material for O-ring, gaskets, tubes, valves and bellows, as well as useful in linings, protective gloves, and shoes. In addition, this iodo-terminated telechelic also provides new route to preparing segmental polymers (block or graft copolymers), which is composed of two or more different polymer segments.

Theoretically, the most effective way to prepare functional fluoropolymers is by copolymerization of the fluorinated monomers with functional comonomers. Numerous attempts have met with limited success. Several new functional monomers have been synthesized and studied, including non-fluorinated comonomers (having a $CH_2$=CH- vinyl group) and fluorinated comonomers (having a $CF_2$=CF- vinyl group) (*J. of Fluorine Chem.*, 104, 53, 2000).

In general, random copolymerization between the fluorinated monomer and non-fluorinated monomer is very difficult, due to the opposite e values (the inductive effect of the monomer). In fact, several reported copolymerization reactions between fluorinated monomers and non-fluorinated monomers, such as ethylene, vinyl ether, and N-vinyl pyrrolidone, showed a strong tendency of forming alternative copolymer structures (see Boutevin, et al. *Macromol. Symp.* 82, 1, 1994). In addition, the introduction of the non-fluorinated functional comonomers significantly degrade the properties of the final products. To preserve the desirable fluoropolymer properties, the fluorinated functional comonomers containing a $CF_2$=CF- vinyl group that is incorporated into the perfluorinated polymer backbone after polymerization is preferably used during the copolymerization reaction.

In general, the perfluorinated functional comonomers are expensive chemicals. Among these comonomers, perfluorovinyl functional monomers, i.e. $CF_2$=$CF(CF_2)_n(CH_2)_mX$, where n=0–10, m=1–4, and X=—OH, —COOH or epoxy group, developed by Daikin Company are most interesting in copolymerization reactions (U.S. Pat. No. 4,544,720). They are very effective in the copolymerization reactions to achieve good incorporation and high copolymer molecular weight. Recently, Ameduri, et al. also reported several trifluorovinyl functional monomers, i.e. $CF_2=CF(CH_2)_mX$, where m=1–3 and X=—OH, $OCOCH_3$, —COOH, $SO_3H$, epoxy, thiol functional groups, which were synthesized via telomerization reaction. (see *J. Applied Polym. Sci.* 73, 189, 1999, *J. Fluorine Chem.*, 93, 117, 1999; *J. Fluorine Chem.*, 114, 171, 2002). However, these functional comonomers usually give low yields, less than 20%, and low molecular weight copolymers, less than 3,000 g/mole. This is due to the existence of allylic hydrogen atoms in the comonomers. As is well-known in the art, regular free radical polymerization of monomers having allylic hydrogen facilitates chain transfer reaction, therefore reducing the polymer molecular weight and catalyst activity.

Additionally, the preparation of fluoropolymers typically requires special reaction conditions, partially due to the relatively low reactivity that is attributed from electron deficiency and to the lack of resonance in the double bond. In the past decades, two processes have evolved for the polymerization of fluorinated monomer—suspension and emulsion processes in aqueous solution. Many catalyst systems have been employed including the inorganic peroxides such as potassium, sodium, or ammonium persulfate, and organic peroxides such as dibenzoyl peroxide, diacetyl peroxide or di-tert-butylperoxide. Both inorganic and organic initiators have some disadvantages. The inorganic peroxy initiators produce polymers with less processability and somewhat thermal instability while organic peroxide initiators require extreme conditions in polymerization, such as high pressure, high temperature, and long reaction time to achieve a reasonable yield.

In the past few years, Chung et al. have developed new radical initiators that are relatively stable and can initiate living radical polymerization at ambient temperature. The chemistry was based on the mono-oxidation adducts of trialkylborane as the living radical initiator. The original research objective was centered around the functionalization of polyolefins by first incorporating borane groups into a polymer chain, which was then selectively oxidized by oxygen to form the mono-oxidized borane moieties that initiated free radical graft-form polymerization at ambient temperature to form polyolefin graft and block copolymers (Chung, et. al, U.S. Pat. Nos. 5,286,800 and 5,401,805; *Macromolecules*, 26, 3467, 1993; *Macromolecules*, 31, 5943, 1998; *J. Am. Chem. Soc.*, 121, 6763, 1999). Several relatively stable radical initiators were discovered, which exhibited living radical polymerization characteristics, with a linear relationship between polymer molecular weight and monomer conversion and producing block copolymers by sequential monomer addition (see Chung, et.al, U.S. Pat. Nos. 6,420,502 and 6,515,088, *J. Am. Chem. Soc.*, 118, 705, 1996). This stable radical initiator system was recently extended to the polymerization of fluorinated monomers, which can effectively occur in bulk and solution conditions. Some interesting ferroelectric fluoro-terpolymers, showing large electromechanical response, have been prepared with high molecular weight and controlled polymer structure with narrow molecular weight and composition distributions (see Chung, et al., U.S. Pat. No. 6,355,749; *Macromolecules*, 35, 7678, 2002).

However, there is a continuing need for convenient methods for the synthesis of fluoropolymers having one or more functional groups.

SUMMARY OF THE DISCLOSURE

The present invention is directed to a process for preparing functional fluoropolymers and copolymers with an organoborane.

According to the present invention, the advantages of the invention are achieved in part by a process for preparing a functional fluoropolymer, which comprises combining one or more functional fluoromonomer(s) with an organoborane initiator and oxygen to polymerize the fluoromonomer into a functional fluoropolymer.

Further, the advantages of the invention are achieved in part by a process for preparing a functional fluoropolymer, which comprises combining a fluoromonomer with oxygen and an organoborane functional initiator, i.e., an organoborane containing a functional group, to polymerize the fluoromonomer results in a functional fluoropolymer containing a terminal functional group located at the beginning of polymer chain.

Still further, these processes also can be advantageously adapted to copolymerize multiple functional fluoromonomers alone or in combination with one or more non-function fluoromonomers to form an array of fluoro-copolymers having pendent functionality. Advantageously, functional fluoropolymers such as those polymerized using the organoborane initiator have functional pendent groups containing allylic proton(s), an Si—H group, or an cinnamoyl group. A functional fluoropolymer polymerized using the organoborane functional initiator has a terminal functional group such as $Si(OR)_3$, and OH group, at the beginning of the polymer chain.

Another advantage of the present invention is a functional fluoropolymer having a relatively high molecular weight, e.g., a number average molecular weight of greater than about 5,000 g/mole.

Additional advantages of the present invention will become readily apparent to those skilled in this art from the following detailed description, wherein only the preferred embodiments of the present invention are shown and described, simply by way of illustration, but not limitation. As will be realized, the invention is capable of other and different embodiments, and its several details are capable of modification in various obvious respects, all without departing from the spirit of the present invention. The advantages may be realized and obtained as particularly pointed out in the appended claims. Accordingly, the description is to be regarded as illustrative in nature, and not restrictive.

DETAILED DESCRIPTION OF THE DISCLOSURE

Free radical polymerization is the most common mechanism employed in the polymerization of functional monomers containing heteroatoms or reactive groups (typically used for the subsequent reactions, such as crosslinking reactions). Free radical polymerization is also the only practical commercial method for the preparation of fluoropolymers, such as poly(tetrafluoroethylene) (PTFE), poly (vinylidine fluoride) (PVDF), poly(vinylidine-co-hexafluoropropene) (VDF/HFP elastomer), etc. Traditionally, the polymerization of fluoromonomers is carried out in an emulsion or an aqueous suspension solution together with inorganic or organic peroxides as initiators at elevated temperatures.

However, there are limitations as to the particular monomer that can be employed in these systems. Certain monomers can cause severe side reactions and derail the radical polymerization process, such as monomer having allylic proton(s) adjacent to the vinyl group. The facile chain transfer reaction between the allylic proton(s) and the active site (i.e. the free radical), formed from the initiator at the propagating chain end, has a detrimental effect on the free radical polymerization process. This side reaction prevents the vinyl addition reaction needed for chain extension and, therefore, dramatically reduces the polymer molecular weight and yield. In addition, there are several unsuitable functional groups that cannot be tolerated in traditional radical polymerization of functional fluoromonomers, including Si—H and a cinnamoyl group. These groups cause chain transfer and crosslinking, respectively, during the free radical polymerization process.

After experimentation and investigation, it was discovered that a radical polymerization process for the preparation of functional fluoro-polymers, including the polymerization of monomers having allylic proton(s), Si—H group, and cinnamoyl group, can be achieved to high conversions of the functional fluoromoner to yield relatively high molecular weight polymers. It was determined that the resulting functional fluoro-copolymers can be prepared with well-defined molecular structures, i.e. a broad range of desirable functional groups, designed functional group concentration, random molecular structure, and high polymer molecular weight.

According to certain embodiments of the present invention, functional fluoromoner can be polymerized in high yields, such as greater than about 40%, and to relatively high molecular weights, such as greater than about 5,000 g/mole. The polymerization of these monomers in high yields and high molecular weights have proved elusive due the many potential detrimental side reactions that plague the polymerization of functional fluoromonomers as discussed above. The polymerization and copolymerization processes according to certain embodiments described herein, however, permit the formation of functional fluoropolymers and copolymers.

In practicing the embodiments of the invention, one or more functional fluoromonomers are combined with oxygen and the organoborane initiator or the organoborane functional initiator. Specifically, the organoborane initiator is a trialkylboroane, R—BR'(R"), where R, R' and R" are independently selected from linear, branched, or cyclic alkyl groups having a carbon number from 2 to about 15, preferably from 2 to 10, and most preferably from 2 to 6. The organoborane functional initiator includes regular trialkylborane compounds containing three B—C bonds and alkyl groups and the functionalized trialkylborane species, in which the alkyl group contains a functional group.

It is believed that the organoborane and oxygen combination initiates polymerization of the monomer. It is believed that any fluorinated function monomer can be polymerized with this system. For example, functional fluoromonomers having the following formula are contemplated.

wherein X and Y are independently hydrogen, fluorine and chlorine; o is 0 to 10; p is from 1 to about 6; and J is a functional group, provided that at least one X or Y is a fluorine and preferably where X and Y represent fluorine. In a further embodiment of the invention, J is selected from the group consisting of: OH, halogen (i.e., Cl, Br), ester, epoxy, thiol, $SO_3H$, O—Si—$R_1R_2R_3$, $SiR_1R_2R_3$, and an olefinic group, where $R_1$, $R_2$, and $R_3$ are independently H, halogen (i.e., Cl), a $C_1$ to $C_{10}$ linear, branched, cyclic alkyl or aryl group. Many of these monomers are commercially available or readily derivable from commercial starting compounds.

In addition, other functional fluoromonomers that are useful in the present invention such as trifluorovinyl functional monomers can be conveniently derived from a commercially-available 1,1,2-trifluorobutene-4-bromo-1-butene (BTFB). The corresponding OH and Si—H derivatives can be prepared in good yields as for example, by converting BTFB to a Grignard reagent followed by subsequent derivatization reactions, including oxidation by oxygen and then water to form an OH group followed by coupling reaction with Cl—$Si(CH_3)_2H$ to form a Si—H group, if desired. A scheme showing, as an example, the preparation of some functional fluoromonomers is illustrated below.

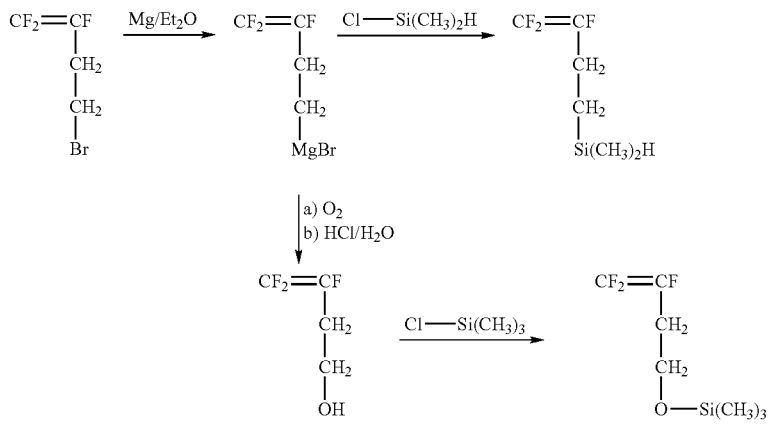

In another aspect of the present invention, copolymers can be prepared by combining at least one functional fluoromonomer and at least one fluoromonomer with the organoborane/oxygen initiator to copolymerize the monomers. A copolymer incorporating one or more of the functional fluoromononers and one or more non-functional monomers results. The copolymers contemplated herein can have a random structure, i.e., where the incorporation of different monomers occurs fairly randomly throughout polymerization.

As used herein, the term "copolymer" is meant to include polymers containing groups or units derived from two or more monomers. Thus, the term "copolymer" is meant to include copolymers, terpolymers, tetrapolymers, etc. The molecular weight of the functional flouropolymer and copolymer of the present invention is preferably above 500 g/mole, e.g., above about 1,000 g/mole. More preferably, the molecular weight is from about 5,000 to about 1,000,000 g/mole. As is common in the art, most molecular weight determinations are made by measuring the average molecular weight of a polymeric material, i.e., a number average, weight average, etc. It is believed that many of the fluoropolymers and copolymers disclosed herein have not been prepared with a high molecular, if at all. Accordingly, it is one aspect of the present invention to prepare the fluoropolymers and copolymers with a number average molecular weight of more than about 5,000 g/mole and preferably no less than about 7,000 g/mole.

Any non-functional fluoromonomer can be used in practicing the present invention, including those well known in the art. Specific examples of suitable fluoromonomers include, without limitation, vinyl fluoride, vinylidine fluoride (VDF), 1-fluoro-1-chloro-ethylene, trifluoroethylene (TrFE), tetrafluoroethylene (TFE), hexafluoropropene (HFP), chlorotrifluoroethylene (CTFE), 1-chloro-2,2-difluoroethylene, perfluoromethyl vinylether (PMVE), etc. These radical polymerizable fluoromonomers can be used either singly or as a combination of two or more monomers.

In one embodiment of the invention, a copolymer is prepared by combining fluoromonomers with an organoborane initiator and oxygen to copolymerize the monomers into a functional fluoro-copolymer having the following formula:

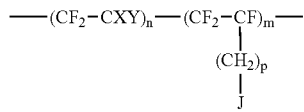

wherein X and Y are independently hydrogen, fluorine and chlorine; p is from 1 to about 6; m is between 0.1 and 40 mole %; n is between about 99.9 mole % to about 60 mole %; and J is a functional group. In the copolymer composition, m is between about 0.1 mole % and about 40 mole %, preferably m is between about 0.5 and 20 mole %, and most preferably m is between 0.5 and 10 mole %; n is between about 99.9 mole % to about 60 mole %; and the combined n+m mole % is 100%.

In a second embodiment of the invention, a copolymer is prepared by combining fluoromonomers with a organoborane functional initiator and oxygen to copolymerize the monomers into a functional fluoropolymer having the following formula:

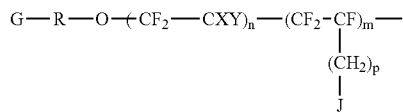

wherein G—R is the residue of organoborane functional initiator, in which G is a functional group and R is a $C_2$–$C_{15}$ linear, branched or cyclic alkyl group or an aryl group; X and Y are independently hydrogen, fluorine and chlorine; p is from 1 to about 6; m is between 0 and 40 mole %; n is between about 100 mole % to about 60 mole %; and J is a functional group. In the copolymer composition, m is between 0 mole % and about 40 mole %, preferably m is between about 0 and 20 mole %, and most preferably m is between 0 and 10 mole %; n is between about 100 mole % to about 60 mole %; and the combined n+m mole % is 100%.

The chemistry with respect to both embodiments is preferably centered on stable radical initiators, such as an alkylborane/$O_2$ initiator, that can directly carry out radical copolymerization of fluoromonomers and trifluorovinyl functional comonomers containing allylic protons and various functional groups including Si—H and olefinic groups. A reaction scheme showing the versatility of, for example, the first embodiment of the inventive process is illustrated below.

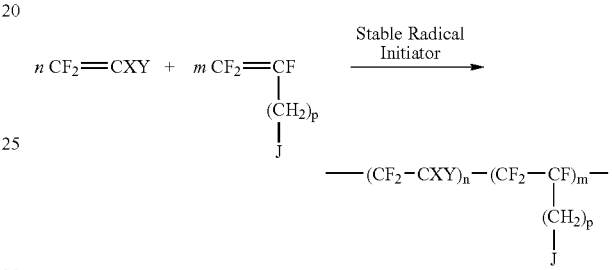

where X, Y, J, p, m and n are defined above for the first embodiment.

In practicing an embodiment of the present invention, a functional fluoromonomer monomer is polymerized by the action of an organoborane together with oxygen. It is believed that any organoborane can be used in practicing embodiments of the present invention. The organoborane can be a trialkyl borane such as represented by the formula: R—BR'(R"), where R, R' and R" are independently selected from an aryl group or linear, branched, or cyclic alkyl groups having a carbon number from 2 to about 15, preferably from 2 to 10, and most preferably from 2 to 6. For example, an alkyl group in the trialkylborane functional initiator contains a functional group which is added to the beginning of the polymer chain during polymerization.

In accordance with another aspect of the invention, stable radical initiators can carry out direct copolymerization of fluoromonomers and trifluorovinyl functional comonomers, including those having allylic protons, Si—H groups, and olefinic groups, without significantly engaging in chain transfer or crosslinking side reactions. The chemistry is believed to involve a low temperature oxygen-activated free radical initiator, based on the mono-oxidation adducts of organoborane molecules, which can be formed in situ during the polymerization. As disclosed in previous reports to Chung et al., it is believed that by controlling oxygen admission some trialkylborane molecules undergo selective mono-oxidation reactions and form free radical initiators for radical polymerization at ambient temperature. (Chung et al. *J. Am. Chem. Soc.*, 118, 705, 1996; *J. Organomet. Chem.*, 581, 176, 1999). Without being bound to any theory, the reaction mechanism of an in situ radical formation and copolymerization of fluoromonomers and trifluorovinyl functional comonomers can be illustrated as shown below.

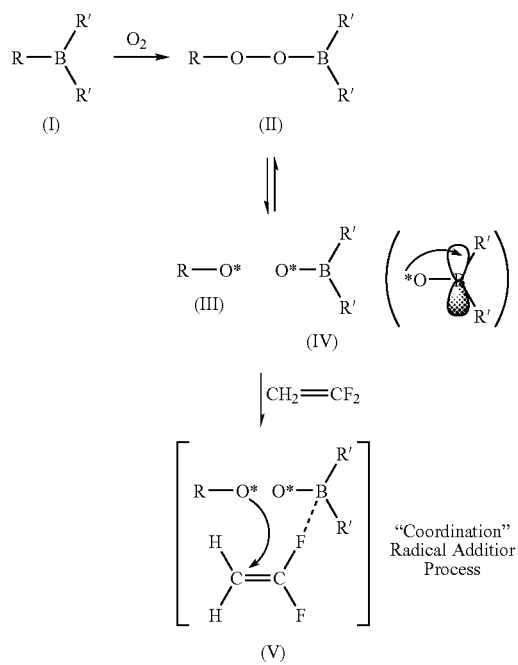

where R and R', are define above. Upon mono-oxidation of one B—C bond in a trialkylborane molecule (I) with a controlled amount of oxygen, the R—O—O—BR'$_2$ species (II) is formed, which further decomposes at ambient temperature to a R—O* alkoxyl radical (III) and a *O—BR'$_2$ borinate radical (IV). The alkoxyl radical is believed active in initiating polymerization of fluoro monomers such as VDF, TrFE, TFE, CTFE and HFP, and functional fluorocomonomers, at ambient temperature. On the other hand, it is believed that the borinate radical is too stable to initiate polymerization due to the back-donating of the free electron to the empty p-orbital of boron. However, this "dormant" borinate radical may form a reversible bond with the radical at the growing chain end to prolong the lifetime of the propagating radical and reduce side reactions, such as chain transfer reaction and crosslinking. In addition, during the propagating reaction, a coordination intermediate (V) may be formed due to the B—F acid-base complex between the active site and the incoming monomer. Such an interaction may enhance the reactivity of fluoromonomer and minimize side reactions, and therefore produce functional fluorocopolymers with the controlled molecular structures.

The copolymerization of fluoromonomers and functional monomers, such as trifluorovinyl functional comonomers, can be carried out in bulk or in solution in a variety of conditions. For example, the temperature for the polymerization may be in the range of from about –10° C. to about 70° C., preferably from about 0 to 50° C., and most preferably from about 10° C. to 40° C. The polymerization time is roughly that needed for most of the monomers to undergo polymerization and is typically in the range of from about 3 minutes to 48 hours, and preferably from about 5 to 24 hours. The resulting functional copolymers were analyzed by Gel Permeation Chromatography (GPC) to estimate the copolymer molecular weights. A combination of elemental analysis, $^1$H, $^{13}$C (DEPT), and $^{19}$F NMR measurements were also performed to determine the compositional make-up of these materials.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

In the examples, the diethyl ether is dried by refluxing over Na/benzophynone. Mg powder, MgSO$_4$, CF$_2$=CFCH$_2$CH$_2$Br (BTFB), (CH$_3$)$_3$SiCl, (CH$_3$)$_2$SiHCl, N,N,N',N',N''-pentamethyl-diethylenetriamine (PMDETA), (n-C$_4$H$_9$)$_3$B, and CH$_2$Cl$_2$ (99.9% anhydrate) are purchased from Aldrich and are used as received. VDF is obtained from Solvay-Solexis, Inc. and HFP is obtained from Daikin America, Inc.

Example 1

Synthesis 1,1,2-trifluoro-4-hydroxyl-1-butene (CF$_2$=CFCH$_2$CH$_2$OH)

In a round-bottomed flask equipped with a condenser and a magnet stirrer, 3.0 g (125 mmol) of magnesium powder was introduced. The flask was flame-dried under vacuum for about 30 min and recharged with argon before adding 200 ml of absolutely dried diethyl ether. Then 19.0 g (100.5 mmol) of CF$_2$=CFCH$_2$CH$_2$Br (BTFB) was added in two steps. Under vigorous stirring, the first fraction 3.0 g of BTFB was injected into the flask. The exothermic reaction causes solvent refluxing. After 5 minutes, the rest of BTFB was added dropwise to keep the solvent refluxing. After completing the BTFB addition, the solution was continuously stirred for another 2 hours before filtrating out the solids to obtain a clear light yellow CF$_2$=CFCH$_2$CH$_2$MgBr/ether solution. This clear light yellow solution was then cooled down to 0° C., when 1.3 liter (54 mmol) of O$_2$ was slowly introduced into the solution for about 30 min. After another 30 min of stirring, 120 ml of 1M HCl/H$_2$O was added. The mixture was stirred for another 30 min, and then the water layer was removed. The organic layer was washed with 50 ml of brine 3 times, then dried by MgSO$_4$. After removing MgSO$_4$ by filtration and the ether by distillation under normal pressure at 80° C., the raw product was fractionally distilled under normal pressure. The final product was collected as a colorless clear liquid by fractional distillation between 110° C. and 115° C. was the final product 8.2 g of CF$_2$=CFCH$_2$CH$_2$OH, with an overall 67% yield. Spectral data of CF$_2$=CFCH$_2$CH$_2$OH are as follows. $^1$H —NMR (300 Mz, CDCl$_3$, r.t.): δ 3.78 ppm (t, 2H, CH$_2$O), δ 2.18 ppm (dq, 2H, CH$_2$CF), δ 1.56 ppm (br s, 1H, OH). $^{19}$F —NMR (300 Mz, CDCl$_3$, r.t.): δ–103.6 ppm (dd), δ–124.4 ppm (dd), δ–176.2 ppm(m).

Example 2

Synthesis 1,1,2-trifluoro-4-trimethylsiloxyl-1-butene (CF$_2$=CFCH$_2$CH$_2$OSi(CH$_3$)$_3$).

Following the same procedure described in Example 1, a clear light yellow CF$_2$=CFCH$_2$CH$_2$MgBr/ether solution was prepared by reacting 3.0 g of Mg with 19.0 g of BTFB in 300 ml diethyl ether. This solution was then added with 7.0 g (41 mmol) of N,N,N',N', N''-pentamethyl-diethylenetriamine (PMDETA). Under vigorous stirring, 11 g (10.2 mmol) of (CH$_3$)$_3$SiCl was added dropwise into the mixture for a period of about 20 min. Stirring was continued for 30 min the resulting slurry was filtered and washed with 100 ml ether for 3 times. The combined filtrate was concentrated by removing ether via distillation at 70° C. under normal pressure, then the trace of remaining ether and excess Me$_3$SiCl was completely removed under vacuum (0.5 mmHg) at 0° C. The pure product (12.2 g) was distilled at 120° C.~125° C., with 61 % yield. Spectral data of 1,1,2-trifluoro-4-trimethylsioxyl-1-butene CF$_2$=CFCH$_2$CH$_2$OSi(CH$_3$)$_3$ are as follows. $^1$H—NMR (300 Mz, CDCl$_3$, r.t.): δ 3.78 ppm (t, 2H, CH$_2$O), δ 2.48 ppm (dq, 2H, CH$_2$CF), δ 0.16 ppm (br t, 9H, SiCH$_3$). $^{19}$F—NMR (300 Mz, CDCl$_3$, r.t.): δ 103.6 ppm (dd), δ 124.5 ppm (dd), δ 176.3 ppm (m).

Example 3

Synthesis dimethyl 3,4,4-trifluoro-3-vinyl-butylsilane (CF$_2$=CFCH$_2$CH$_2$Si(CH$_3$)$_2$H)

Following the same procedure described in Example 1, a clear light yellow CF$_2$=CFCH$_2$CH$_2$MgBr/ether solution was prepared by reacting 4.2 g (175.0 mmol) of Mg with 29.0 g (150.2 mmol) of BTFB in 300 ml diethyl ether. After cooling the solution down to 0° C., 14.1 g (150 mmol) of (CH$_3$)$_2$SiHCl was added. The mixture was slowly warmed to room temperature within 2 hours stirring for an additional 2 hours. The mixture was then cooled to −40° C. in order to let the solid fully separated from the solution. The ether layer was then decanted from the residue. After distilling the ether from the solution at 70° C., the colorless liquid product of CF$_2$=CFCH$_2$CH$_2$Si(CH$_3$)$_2$H (17.2 g) was distilled out at higher temperature, with 60% yield. Spectral data of the product are as follows. $^1$H—NMR (300 Mz, CDCl$_3$, r.t.): δ 3.92 ppm (m, 1H, SiH), δ 1.98 ppm (dm, 2H, CH$_2$CF), δ 0.56 ppm (t, 2H, SiCH$_2$), δ −0.16 ppm (s, 6H, SiCH$_3$). $^{19}$F NMR (300 Mz, CDCl$_3$, r.t.): δ −107.8 ppm (dd), δ 126.0 ppm (t, 2F), δ 174 ppm (m).

Example 4

Polymerization of VDF/CF$_2$=CFCH$_2$CH$_2$Si(CH$_3$)$_2$H via (n-C$_4$H$_9$)$_3$B/O$_2$ The radical polymerization was conducted in a 70 ml stainless autoclave equipped with a magnetic stirrer. After adding 0.34 g of CF$_2$=CFCH$_2$CH$_2$Si(CH$_3$)$_2$H, 91 mg of (n-C$_4$H$_9$)$_3$B, and 20 ml CH$_2$Cl$_2$ under argon, 25 ml of VDF was introduced into the reactor under vacuum by condensing the monomers at liquid nitrogen temperatures. About 4 ml of O$_2$ was then introduced to initiate the polymerization. The autoclave was slowly warmed to room temperature and kept at room temperature for 20 hours. After recovering the unreacted VDF monomers, the polymer slurry was poured into methanol, and the participated polymer powder was dried under vacuum for 24 hours at 80° C. The overall polymer yield was about 55%, and the polymers molecular weight determined by intrinsic viscosity measurement was Mv=48,000 g/mole. The composition of the copolymer, containing 1.2 mole % of CF$_2$=CFCH$_2$CH$_2$—Si(CH$_3$)$_2$H units, was determined by $^1$H NMR spectra.

Example 5

Polymerization of VDF/CF$_2$=CFCH$_2$CH$_2$Si(CH$_3$)$_2$H via (n-C$_4$H$_9$)$_3$B/O$_2$.

Following similar polymerization procedure described in Example 4, the radical polymerization was conducted in a 200 ml stainless autoclave equipped with a magnetic stirrer. After adding 0.7 g of CF$_2$=CFCH$_2$CH$_2$Si(CH$_3$)$_2$H, 91 mg of (n-C$_4$H$_9$)$_3$B, and 100 ml CH$_2$Cl$_2$ under argon, 50 ml of VDF was introduced into the reactor under vacuum by condensing the monomers at liquid nitrogen temperatures. About 4 ml of O$_2$ was then introduced to initiate the polymerization. The autoclave was slowly warmed to room temperature and kept at room temperature for 20 hours. After recovering the unreacted VDF monomers, the polymer slurry was poured into methanol, and the participated polymer powder was dried under vacuum for 24 hours at 80° C. The overall polymer yield was about 40%, and the polymers molecular weight determined by intrinsic viscosity measurement was Mv=96,000 g/mole. The composition of the copolymer, containing 1.0 mole % of CF$_2$=CFCH$_2$CH$_2$Si(CH$_3$)$_2$H units, was determined by $^1$H NMR spectra.

Example 6

Polymerization of VDF/HFP/CF$_2$=CFCH$_2$CH$_2$Si(CH$_3$)$_2$H via (n-C$_4$H$_9$)$_3$B/O$_2$.

The radical polymerization was conducted in a 70 ml stainless autoclave equipped with a magnetic stirrer. After adding 3.0 g of CF$_2$=CFCH$_2$CH$_2$Si(CH$_3$)$_2$H, 0.1 g of (n-C$_4$H$^9$)$_3$B, and 20 ml CH$_2$Cl$_2$ under argon, 20 ml of VDF and 5 ml of HFP were introduced into the reactor under vacuum by condensing the monomers at liquid nitrogen temperatures. About 15 ml of O$_2$ was then introduced to initiate the polymerization. The autoclave was slowly warmed to room temperature and then immersed in an oil bath at 80° C. for 20 hours. After recovering the unreacted monomers, the slurry was dried under vacuum to obtain 4.5 g of a white polymer powder, with 40% yield.

Examples 7–11

Polymerization of VDF/HFP/CF$_2$=CFCH$_2$CH$_2$Si(CH$_3$)$_2$H by (n-C$_4$H$_9$)$_3$B/O$_2$ initiator In a series of examples, the similar polymerization procedure described in Example 6 was carried out in a 70 ml stainless autoclave equipped with a magnetic stirrer. After adding 3.0 g of CF$_2$=CFCH$_2$CH$_2$Si(CH$_3$)$_2$H, 0.1 g of (n-C$_4$H$_9$)$_3$B and 20 ml CH$_2$Cl$_2$ under argon, 20 ml of VDF and 5 ml of HFP were introduced into the reactor under vacuum by condensing the monomers at liquid nitrogen temperatures. About 15 ml of O$_2$ was then introduced to initiate the polymerization. The autoclave was warmed to room temperature gradually and then immersed in an oil bath at various temperatures (room temperature (r.t.), 40° C., 60° C., 80° C., and 100° C. for 20 hours. After recovering the unreacted monomers, the slurry was dried under vacuum to obtain a white polymer powder. The terpolymer molecular weight was determined by Gel Permeation Chromatography (GPC), and the terpolymer composition was determined by $^1$H and $^{19}$F NMR spectra. Table 1 summarizes the experimental results.

TABLE 1

A summary of terpolymerization of VDF/HFP/CF$_2$=CFCH$_2$CH$_2$Si(CH$_3$)$_2$H by (n-C$_4$H$_9$)$_3$B/O$_2$ initiator

| Example No. | Temp. (° C.) | Conversion (%) | Compostion (mole %) HFP | Si | Mw (g/mole) | Mn (g/mole) |
|---|---|---|---|---|---|---|
| 7 | r.t. | 0.0 | | | | |
| 8 | 40 | 5.0 | 2.1 | 0.0 | | |
| 9 | 60 | 22 | 5.0 | 0.6 | 13,600 | 7,300 |

TABLE 1-continued

A summary of terpolymerization of
VDF/HFP/CF$_2$=CFCH$_2$CH$_2$Si(CH$_3$)$_2$H
by (n-C$_4$H$_9$)$_3$B/O$_2$ initiator

| Example No. | Temp. (° C.) | Conversion (%) | Compostion (mole %) HFP | Si | Mw (g/mole) | Mn (g/mole) |
|---|---|---|---|---|---|---|
| 10 | 80 | 40 | 5.4 | 1.0 | 16,000 | 9,300 |
| 11 | 100 | 15 | | | | |

Example 12

Polymerization of VDF/HFP/CF$_2$=CFCH$_2$CH$_2$Si(CH$_3$)$_2$H by AIBN initiator.

The procedure of Example 6 was followed, except solvent and initiator were varied. Due to the well-known unsuitability of CH$_2$Cl$_2$ as a solvent in regular free radical polymerization systems, including AIBN, the solvent was changed to acetonitrile. After adding 0.3 g of AIBN, 3.0 g of CF$_2$=CFCH$_2$CH$_2$Si(CH$_3$)$_2$H, and 30 ml of acetonitrile in a 70 ml stainless autoclave equipped with a magnetic stirrer, 20 ml of VDF and 5 ml of HFP were introduced into the reactor under vacuum by condensing the monomers at liquid nitrogen temperatures. The autoclave was warmed to room temperature gradually and then immersed in an oil bath at 70° C. for 20 hours. After recovering the unreacted monomers, clear solution was observed, and only trace amount (<0.1 g) of white powder was obtained after removing the volatiles.

Example 13

Polymerization of VDF/HFP/CF$_2$=CFCH$_2$CH$_2$Si(CH$_3$)$_2$H by AIBN/I(CF$_2$)$_4$I initiator The procedure of Example 6 was followed, except solvent and initiator were varied. Due to the well-known unsuitability of CH$_2$Cl$_2$ as a solvent in regular free radical polymerization systems, including AIBN case, the solvent was changed to acetonitrile. After adding 0.3 g of AIBN, 0.8 g of I(CF$_2$)$_4$I, 3.0 g of CF$_2$=CFCH$_2$CH$_2$Si(CH$_3$)$_2$H, and 30 ml of acetonitrile in a 70 ml stainless autoclave equipped with a magnetic stirrer, 20 ml of VDF and 5 ml of HFP were introduced into the reactor under vacuum by condensing the monomers at liquid nitrogen temperatures. The autoclave was warmed to room temperature gradually and then immersed in an oil bath at 70° C. for 20 hours. After recovering the unreacted monomers, clear solution was observed, and only trace amount (<0.1 g) of white powder was obtained after removing the volatiles.

Example 14

Polymerization of VDF/HFP/CF$_2$=CFCH$_2$CH$_2$Si(CH$_3$)$_2$H by benzoyl peroxide (BPO) initiator The procedure of Example 6 was followed, except solvent and initiator were varied. Due to the well-known unsuitability of CH$_2$Cl$_2$ as a solvent in regular free radical polymerization systems, including BPO, the solvent was changed to acetonitrile. After adding 0.26 g of BPO, 3.0 g of CF$_2$=CFCH$_2$CH$_2$Si(CH$_3$)$_2$H, and 30 ml of acetonitrile in a 70 ml stainless autoclave equipped with a magnetic stirrer, 20 ml of VDF and 5 ml of HFP were introduced into the reactor under vacuum by condensing the monomers at liquid nitrogen temperatures. The autoclave was warmed to room temperature gradually and then immersed in an oil bath at 100° C. for 20 hours. After recovering the unreacted monomers, clear solution was observed, and only trace amount (<0.1 g) of white powder was obtained after removing the volatiles.

Example 15

Polymerization of VDF/CF$_2$=CFCH$_2$CH$_2$OSi(CH$_3$)$_3$ by (n-C$_4$H$_9$)$_3$B/O$_2$ initiator The radical polymerization was conducted in a 70 ml stainless autoclave equipped with a magnetic stirrer. After adding 0.84 g of CF$_2$=CFCH$_2$CH$_2$OSi(CH$_3$)$_3$, 91 mg of (n-C$_4$H$_9$)$_3$B, and 20 ml CH$_2$Cl$_2$ under argon, 25 ml of VDF was introduced into the reactor under vacuum by condensing the monomers at liquid nitrogen temperatures. About 4 ml of O$_2$ was then introduced to initiate the polymerization. The autoclave was slowly warmed to room temperature and then kept at room temperature for 20 hours. After recovering the unreacted monomers, the slurry was poured into methanol, and the participated polymer powder was dried under vacuum for 24 hours at 80° C. The overall polymer yield was about 60%, and the polymers molecular weight determined by intrinsic viscosity was Mv=53,000 g/mole. The composition of the copolymer, containing 1.5 mole % of CF$_2$=CFCH$_2$CH$_2$OSi(CH$_3$)$_3$ units, was determined by $^1$H NMR spectra.

Example 16

Polymerization of VDF/CF$_2$=CFCH$_2$CH$_2$OSi(CH$_3$)$_3$ by (n-C$_4$H$_9$)$_3$B/O$_2$ initiator The procedure of Example 15 was followed in a 200 ml stainless autoclave equipped with a magnetic stirrer. After adding 1.68 g of CF$_2$=CFCH$_2$CH$_2$OSi(CH$_3$)$_3$, 91 mg of (n-C$_4$H$_9$)$_3$B, and 100 ml CH$_2$Cl$_2$ under argon, 50 ml of VDF was introduced into the reactor under vacuum by condensing the monomers at liquid nitrogen temperatures. About 4 ml of O$_2$ was then introduced to initiate the polymerization. The autoclave was slowly warmed to room temperature and then kept at room temperature for 20 hours. After recovering the unreacted monomers, the slurry was poured into methanol, and the participated polymer powder was dried under vacuum for 24 hours at 80° C. The overall polymer yield was about 40%, and the polymers molecular weight determined by intrinsic viscosity was Mv=82,000 g/mole. The composition of the copolymer, containing 1.4 mole % of CF$_2$=CFCH$_2$CH$_2$OSi(CH$_3$)$_3$ units, was determined by $^1$H NMR spectra.

Examples 17–19

Polymerization of VDF/HFP/CF$_2$=CFCH$_2$CH$_2$OSi(CH$_3$)$_3$ by (n-C$_4$H$_9$)$_3$B/O$_2$ initiator In a series of examples, the similar polymerization procedure described in Example 15 was carried out in a 70 ml stainless autoclave equipped with a magnetic stirrer, except adding an additional HFP comonomer. After adding 3.0 g of CF$_2$=CFCH$_2$CH$_2$OSi(CH$_3$)$_3$, 0.1 g of (n-C$_4$H$_9$)$_3$B and 20 ml CH$_2$Cl$_2$ under argon atmosphere, 20 ml of VDF and 5 ml of HFP were introduced into the reactor under vacuum by condensing the monomers at liquid nitrogen temperatures, then injecting with 15 ml of $O_2$. The autoclave was warmed to room temperature or immersed in an oil bath at 40° C. or 70° C. for 20 hours. After recovering the unreacted monomers, the slurry was dried by under vacuum to obtain polymer. The polymer's molecular weight was determined by Gel Permeation Chromatography (GPC), and the terpolymer composition was determined by $^1H$ and $^{19}F$ NMR spectra. Table 2 summarizes the experimental results.

TABLE 2

Summary of polymer properties of the terpolymerization of VDF/HFP/$CF_2$=$CFCH_2CH_2OSi(CH_3)_3$ by (n-$C_4H_9$)$_3$B/$O_2$ initiator

| Example No. | Temp. (° C.) | Conversion (%) | Composition (mole %) HFP | Composition (mole %) Si | Mn (g/mole) | Mw (g/mole) | PDI (Mw/Mn) |
|---|---|---|---|---|---|---|---|
| 17 | 25 | 0.0 | | | | | |
| 18 | 40 | 15.0 | 4.0 | 0.5 | 4,800 | 7,400 | 1.7 |
| 19 | 70 | 40 | 7.5 | 1.2 | 9,800 | 15,400 | 1.6 |

Example 20

Synthesis of VDF/HPF Copolymer Containing OH Groups 2.0 g of VDF/HFP/$CF_2$=$CFCH_2CH_2OSi(CH_3)_3$ terpolymer obtained from Example 19 was dissolved in 30 ml THF. After adding about 10 ml of 6N HCl/$H_2O$ solution, the mixture was stirred at room temperature for 5 hours at room temperature. After removing all the volatiles, the attained polymer was washed with 30 ml of methanol, three times, and dried under vacuum for 24 hours at 80° C. Based on $^1H$ NMR spectra, the conversion of O—Si($CH_3$)$_3$ to —OH was greater than 98%.

Example 21

Synthesis of VDF/HPF Copolymer Containing Cinnamoyl Groups 2.0 g of the VDF/HFP copolymer containing OH groups obtained from Example 20 was dissolved in 30 ml of THF. After adding 2.0 g of pyridine and 2.0 g of cinnamoyl chloride, the mixture was stirred and refluxed for 5 hours. After removing all the volatiles, the attained polymer was washed with 30 ml of methanol, three times, and dried under vacuum for 24 hours at 80° C. Based on $^1H$ NMR spectra, the conversion of O—H to —O—C(=O)CH=CH—$C_6H_5$ was greater than about 95%.

Example 22

Cross-linking of VDF/HFP copolymer containing cinnamoyl groups by UV irradiation About 50 mg of VDF/HPF copolymer containing cinnamoyl groups obtained from Example 21 was completely dissolved in 0.5 ml of acetone. The homogeneous polymer solution was then exposed to UV irradiation for 30 seconds. Gel particles were immediately observed in the solution. FTIR spectrum of the resulting insoluble polymer showed high conversion (>85%) of —O—C(=O)CH=CH—$C_6H_5$ into cyclic butyl structure (crosslinker).

Example 23

Polymerization of VDF/HFP/$CF_2$=$CFCH_2CH_2OSi(CH_3)_3$ by AIBN initiator

The procedure of Example 17 was followed, except solvent and initiator were varied. Due to the well-known unsuitability of $CH_2Cl_2$ as a solvent in regular free radical polymerization systems, including AIBN case, the solvent was changed to acetonitrile. After adding 0.3 g of AIBN, 3.0 g of $CF_2$=$CFCH_2CH_2OSi(CH_3)_3$, and 30 ml of acetonitrile in a 70 ml stainless autoclave equipped with a magnetic stirrer, 20 ml of VDF and 5 ml of HFP were introduced into the reactor under vacuum by condensing the monomers at liquid nitrogen temperatures. The autoclave was warmed to room temperature gradually and then immersed in an oil bath at 70° C. for 20 hours. After recovering the unreacted monomers, clear solution was observed, and only trace amount (<0.1 g) of white powder was obtained after removing the volatiles.

Example 24

Polymerization of VDF/HFP/$CF_2$=$CFCH_2CH_2OSi(CH_3)_3$ by AIBN/I($CF_2$)$_4$I initiator The procedure of Example 17 was followed, except solvent and initiator were varied. Due to the well-known unsuitability of $CH_2Cl_2$ as a solvent in regular free radical polymerization systems, including AIBN case, the solvent was changed to acetonitrile. After adding 0.3 g of AIBN, 0.8 g of I($CF_2$)$_4$I, 3.0 g of $CF_2$=$CFCH_2CH_2OSi(CH_3)_3$, and 30 ml of acetonitrile in a 70 ml stainless autoclave equipped with a magnetic stirrer, 20 ml of VDF and 5 ml of HFP were introduced into the reactor under vacuum by condensing the monomers at liquid nitrogen temperatures. The autoclave was warmed to room temperature gradually and then immersed in an oil bath at 70° C. for 20 hours. After recovering the unreacted monomers, clear solution was observed, and only trace amount (<0.1 g) of white powder was obtained after removing the volatiles.

Example 25

Synthesis of [$C_2H_5OSi(CH_3)_2CH_2CH_2CH_2$]$_3$B Functional Initiator

In a 1000 ml flame-dried flask equipped with a magnetic stir bar, 250 ml of dry ether and 37 g (250 mmol) of diethoxyldimethylsilane were injected under argon. The solution was vigorously stirred while 250 ml of allylmagnesiumbromide in ether (1.0 M) was added dropewise over 2 hours. The solution was refluxed overnight to complete the coupling reaction. After cooling the mixture to −20° C. and removing the solid by filtration, the solvent was removed by rovaperation. The raw product was subjected to vacuum distillation to obtain 30 g of pure allylethoxyldimethylsilane (colorless liquid) with yield of 84%.

In a 500 ml flamed-dried flask equipped with a magnetic stir bar, 250 ml of dry ether and 30 g (210 mmol) of allylethoxyldimethylsilane was injected into the flask. After the solution was cooled down to 0° C., 70 ml of $BH_3$ in THF (1.0 M) was added. The mixture was then stirred at 0° C. for 4 hours before warming up to ambient temperature for another 1 hour. After removing solvent by vacuum, 22.3 g of tri-3-(dimethylethoxylsilyl)propylborane functional initiator (with 71% yield) was obtained by distillation at 150° C.~160° C. under high vacuum.

Example 26

Synthesis of $[(C_2H_5O)_3SiCH_2CH_2]_3B$ Functional Initiator

Following similar procedure described in Example 25, 250 ml of dry THF and 35 g (180 mmol) of vinyltriethoxylsilane was injected into a 500 ml dry flask equipped with a magnetic stir bar. After cooling the solution to 0° C., 60 ml of $BH_3$ in THF (1.0 M) was added. The mixture was stirred at 0° C. for 4 hours and then was warmed to ambient temperature for 1 hour to assure complete hydroboration reaction. After solvent-removal, the product was subjected to vacuum distillation at 170° C. to obtain 23.4 g of tri-3-(dimethylethoxylsilyl)-ethylborane.

Examples 27–34

Synthesis of PVDF Polymers Containing a Terminal $C_2H_5OSi(CH_3)_2$ Group

A series of $C_2H_5OSi(CH_3)_2$ group terminated PVDF polymers were prepared by using $[C_2H_5OSi(CH_3)_2CH_2CH_2CH_2]_3B$ functional initiator (obtained from Example 25). The experimental conditions and results are summarized in Table 3. All reactions were carried out in a Parr high pressure reactor (200 ml) equipped with a magnetic stir bar. In a typical reaction (Example 31), 2.3 g of $[C_2H_5OSi(CH_3)_2CH_2CH_2CH_2]_3B$ (5 mmol) was dissolved in 100 ml of $CH_2Cl_2$ dry box, the reactor was then connected to a vacuum line, and 25.6 g (400 mmol) of VDF was condensed under vacuum by liquid nitrogen. About 2.5 mmol $O_2$ was charged into the reactor to oxidize borane moiety and initiate the polymerization that was carried out at ambient temperature for 4 hours. After releasing the pressure, the mixture was transferred into a flask containing 100 ml of hexane. After stirring for 30 min, the polymer powder was filtered, washed, and dried under vacuum at 60° C. for 6 hours. About 19 g of polymer was obtained.

TABLE 3

Summary of PVDF Polymers Containing A Terminal $C_2H_5OSi(CH_3)_2$ Group Prepared by $[C_2H_5OSi(CH_3)_2CH_2CH_2CH_2]_3B/O_2$ Initiator

| Ex. | B (mmol) | $O_2$ (mmol) | VDF (mmol) | Yield (%) | Remark |
|---|---|---|---|---|---|
| 27 | 1.0 | 0.5 | 400 | 10 | White powder |
| 28 | 2.0 | 1.0 | 400 | 16 | White powder |
| 29 | 5.0 | 1.0 | 400 | 18 | White powder |
| 30 | 5.0 | 2.0 | 400 | 47 | White powder |
| 31 | 5.0 | 2.5 | 400 | 74 | White powder |
| 32 | 5.0 | 3.0 | 400 | 86 | White powder |
| 33 | 5.0 | 5.0 | 400 | 81 | White powder |
| 34 | 10.0 | 5.0 | 400 | 85 | White powder |

Examples 35–40

Synthesis of PVDF Polymers Containing A Terminal $(C_2H_5O)_3Si$ Group

A series of $(C_2H_5O)_3Si$ Group terminated PVDF polymers were prepared by using $[(C_2H_5O)_3SiCH_2CH_2]_3B$ functional initiator (obtained from Example 26). Table 4 summarizes the experimental conditions and results. All polymerization reactions were carried out in a Parr high pressure reactor (200 ml) equipped with a magnetic stir bar. In a typical reaction, 2.9 g of $[(C_2H_5O)_3SiCH_2CH_2]_3B$ (5 mmol) was dissolved in 100 ml of $CH_2Cl_2$ in a dry box, the reactor was then connected to a vacuum line, and 25.6 g of VDF (400 mmol) was condensed under vacuum by liquid nitrogen. About 2.5 mmol $O_2$ was charged into the reactor to oxidize borane moiety and initiate the polymerization that was carried out at ambient temperature for 4 hours. After releasing the pressure, the mixture was transferred into a flask containing 100 ml of hexane. After stirring for 30 min, the polymer powder was filtered, washed, and then dried under vacuum at 60° C. for 6 hours. About 21 g of polymer was obtained with yield of 82%.

TABLE 4

Summary of PVDF Polymers Containing A Terminal $(C_2H_5)_3OSi$ Group Prepared by $[(C_2H_5O)_3SiCH_2CH_2]_3B/O_2$ Initiator

| Ex. | B (mmol) | $O_2$ (mmol) | VDF (mmol) | Yield (%) | Remark |
|---|---|---|---|---|---|
| 35 | 1.0 | 0.5 | 400 | 12 | White powder |
| 36 | 2.0 | 1.0 | 400 | 23 | White powder |
| 37 | 5.0 | 1.0 | 400 | 32 | White powder |
| 38 | 5.0 | 2.5 | 400 | 82 | White powder |
| 39 | 5.0 | 5.0 | 400 | 73 | White powder |
| 40 | 10.0 | 5.0 | 400 | 86 | White powder |

Examples 41–44

Synthesis of VDF/HFP Copolymers Containing A Terminal $C_2H_5OSi(CH_3)_2$ Group

A series of $C_2H_5OSi(CH_3)_2$ group terminated VDF/HFP copolymers were prepared by using $[C_2H_5OSi(CH_3)_2CH_2CH_2CH_2]_3B$ functional initiator (obtained from Example 25). The experimental conditions and results are summarized in Table 5. All reactions were carried out in a Parr high pressure reactor (200 ml) equipped with a magnetic stir bar. In a typical reaction, 4.6 g of $[C_2H_5OSi(CH_3)_2CH_2CH_2CH_2]_3B$ (10 mmol) was dissolved in 80 ml of $CH_2Cl_2$ in a dry box, the reactor was then connected to a vacuum line, and 25.6 g of VDF (400 mmol) and 60 g of HFP (400 mmol) was condensed under vacuum by liquid nitrogen. About 5 mmol $O_2$ was charged into the reactor to oxidize borane moiety and initiate the polymerization that was carried out at 60° C. for 10 hours. After releasing the pressure, the mixture was transferred into a flask containing 100 ml of hexane. After stirring for 30 min, the polymer powder was filtered, washed, and dried under vacuum at 60° C. for 6 hours. About 21 g of polymer was obtained with yield of 26%. The polymer structure was confirmed by $^1H$ and $^{19}F$ NMR spectra.

TABLE 5

Summary of VDF/HFP Copolymers Containing A Terminal $C_2H_5OSi(CH_3)_2$ Group Prepared by $[C_2H_5OSi(CH_3)_2CH_2CH_2CH_2]_3B/O_2$ Initiator

| Ex. | B (mmol) | $O_2$ (mmol) | VDF (mmol) | HFP (mmol) | Yield (%) | HFP (%) | Remark |
|---|---|---|---|---|---|---|---|
| 41 | 10.0 | 5.0 | 400 | 200 | 37 | 6.2 | White powder |
| 42 | 10.0 | 5.0 | 400 | 300 | 30 | 8.7 | White powder |

TABLE 5-continued

Summary of VDF/HFP Copolymers Containing A Terminal $C_2H_5Si(CH_3)_2$ Group Prepared by $[C_2H_5OSi(CH_3)_2CH_2CH_2CH_2]_3B/O_2$ Initiator

| Ex. | B (mmol) | O$_2$ (mmol) | VDF (mmol) | HFP (mmol) | Yield (%) | HFP (%) | Remark |
|---|---|---|---|---|---|---|---|
| 43 | 10.0 | 5.0 | 400 | 400 | 26 | 12.6 | White powder |
| 44 | 10.0 | 5.0 | 200 | 400 | 18 | 16.4 | Viscose liquid |

Examples 45–48

Synthesis of VDF/HFP Copolymers Containing A Terminal $(C_2H_5O)_3Si$ Group

A series of $(C_2H_5O)_3Si$ Group terminated VDF/HFP copolymers were prepared by using $[(C_2H_5O)_3SiCH_2CH_2]_3B$ functional initiator (obtained from Example 26). Table 6 summarizes the experimental conditions and results. All polymerization reactions were carried out in a Parr high pressure reactor (200 ml) equipped with a magnetic stir bar. In a typical reaction 4.6 g of $[(C_2H_5O)_3SiCH_2CH_2]_3B$ (10 mmol) was dissolved in 80 ml of $CH_2Cl_2$ in a dry box, the reactor was then connected to a vacuum line, and 25.6 g of VDF (400 mmol) and 60 g of HFP (400 mmol) was condensed under vacuum by liquid nitrogen. About 5 mmol $O_2$ was charged into the reactor to oxidize borane moiety and initiate the polymerization that was carried out at 60° C. for 10 hours. After cooling down to room temperature and releasing the pressure, the mixture was transferred into a flask containing 100 ml of hexane. After stirring for 30 min, the polymer powder was filtered, washed, and then dried under vacuum at 60° C. for 6 hours. About 24 g of polymer (white soft wax) was obtained with yield of 28%. The polymer structure was confirmed by $^1H$ and $^{19}F$ NMR spectra.

TABLE 6

Summary of PVDF Polymers Containing A Terminal $(C_2H_5)_3OSi$ Group Prepared by $[(C_2H_5O)_3SiCH_2CH_2]_3B/O_2$ Initiator

| Ex. | B (mmol) | O$_2$ (mmol) | VDF (mmol) | HFP (mmol) | Yield (%) | HFP (% mol) | Remark |
|---|---|---|---|---|---|---|---|
| 45 | 10.0 | 5.0 | 400 | 200 | 40 | 6.8 | White powder |
| 46 | 10.0 | 5.0 | 400 | 300 | 33 | 9.2 | White powder |
| 47 | 10.0 | 5.0 | 400 | 400 | 28 | 13.0 | Hard wax |
| 48 | 10.0 | 5.0 | 200 | 400 | 17 | 17.2 | viscose |

Only the preferred embodiments of the present invention and examples of their versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A process for preparing a functional fluoro-copolymer, the process comprising combining one or more fluoromonomers and one or more functional fluoromonomer with an organoborane functional initiator and oxygen to copolymerize the monomers into a functional fluoro-copolymer having the following formula:

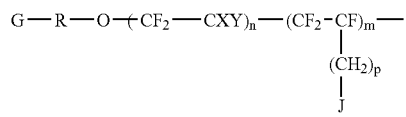

wherein G—R is the residue of organoborane initiator, in which G is a functional group and R is a $C_{2-C_{15}}$ alkyl group or an aryl group, X and Y are independently hydrogen or halogen; p is from 1 to about 6; m is between 0 to about 40 mole %; n is between about 100 mole % to about 60 mole %, and J is a functional group, provided that at least one X or Y is a fluorine.

2. The process according to claim 1, wherein G is selected from the group consisting of: OH and Si(OR)$_3$, wherein R is a $C_2$ to $C_{15}$ linear, branched or cyclic alkyl group.

3. The process according to claim 1, wherein the fluoromonomer is selected from the group consisting of: vinyl fluoride, vinylidene difluoride, 1-fluoro-1-chloro-ethylene, 1-chloro-2,2-difluoroethylene, chlorotrifluoroethylene, trifluoroethylene, tetrafluoroethylene, hexafluoropropene, and perfluoromethyl vinylether.

4. The process according to claim 1 wherein the organoborane functional initiator is a trialkylboroane, R—B—R'(R"), where R, R' and R" are independently selected from linear, branched or cyclic alkyl groups having a carbon number from 2 to about 15 or an aryl group.

5. The process according to claim 4, wherein the carbon number is from 2–10.

6. The process according to claim 4, wherein the carbon number is from 2–6.

7. The process according to claim 1, wherein J is selected from the group consisting of: OH, halogen, O—Si—R$_1$R$_2$R$_3$, SiR$_1$R$_2$R$_3$, and an olefinic group, wherein R$_1$, R$_2$, and R$_3$ are independently H, halogen or a $C_1$ to $C_{10}$ linear, branched or cyclic alkyl group.

8. The process according to claim 1, comprising copolymerizing the functional fluoromonomer to greater than about 35%.

9. The process according to claim 1, wherein the organoborane initiator is a trialkylborane.

10. The process according to claim 1, wherein m is between 0 and 20 mole % and n+m equals 100 mole %.

* * * * *